United States Patent [19]

Yoo et al.

[11] Patent Number: 5,497,191
[45] Date of Patent: Mar. 5, 1996

[54] IMAGE SHAKE COMPENSATION CIRCUIT FOR A DIGITAL VIDEO SIGNAL

[75] Inventors: Yong T. Yoo; Choon Lee, both of Seoul, Rep. of Korea

[73] Assignee: Goldstar Co., Ltd., Seoul, Rep. of Korea

[21] Appl. No.: 351,779

[22] Filed: Dec. 7, 1994

[30] Foreign Application Priority Data

Dec. 8, 1993 [KR] Rep. of Korea .................. 26931/1993

[51] Int. Cl.⁶ .................................................. H04N 5/225
[52] U.S. Cl. .......................................... 348/208; 348/699
[58] Field of Search ...................................... 348/208, 413, 348/414, 416, 417, 418, 699, 700

[56] References Cited

U.S. PATENT DOCUMENTS

| | | | |
|---|---|---|---|
| 4,727,422 | 2/1988 | Hinman | 348/416 |
| 4,864,409 | 9/1989 | Platte et al. | 348/208 |
| 5,251,030 | 10/1993 | Tanaka | 348/416 |
| 5,379,063 | 1/1995 | Kishi et al. | 348/208 |

*Primary Examiner*—Wendy R. Greening

[57] ABSTRACT

An image shake compensation circuit comprising a motion information detector for detecting motion information based on the occurrence of an image shake when the image shake occurs in an encoded video signal, a shake compensator for obtaining a start display position of an image of a present frame according to the motion information detected by the motion information detector, and a decoder for decoding the encoded video signal, correcting a display position of the image of the present frame in response to an output signal from the shake compensator if the encoded video signal has previously been compensated for the image shake and compensating for the image sake if the encoded video signal has not previously been compensated for the image shake.

19 Claims, 3 Drawing Sheets

AFTER SHAKE

IMAGE SHAKE COMPENSATION CIRCUIT FOR A DIGITAL VIDEO SIGNAL

BACKGROUND OF THE INVENTION

1. Field of the Invention

The present invention relates in general to a circuit for compensating an image shake on a display unit, and more particularly to an image shake compensation circuit for compensating an image shake resulting from a camera tremble, while an optical image of a certain scene is produced by a camera and the produced optical image is converted into an electrical signal to provide a distinct picture.

2. Description of the Prior Art

Generally, an optical image of a certain scene is produced by a camera and the produced optical image is converted into an electrical signal. Then, a video signal is produced by processing the electrical signal through various signal processing procedures. At this time, the produced optical image may be shaken due to an external tremble such as a tremble of the user's hands. To compensate for such an image shake, there has been employed an image shake compensation circuit. Such a conventional image shake compensation circuit is typically of an analog type. In the conventional image shake compensation circuit, the image shake is compensated by a shake prevention circuit contained in the camera. The image shake-compensated video signal is then applied to a display unit such as a television receiver through transmission and reception procedures. As a result, the shot scene is displayed as a picture.

However, the above-mentioned conventional image shake compensation circuit has a disadvantage in that it cannot be applied to a digital video signal processing system which compresses and expands the video signal in a digital manner, because it is of the analog type.

SUMMARY OF THE INVENTION

Therefore, the present invention has been made in view of the above problem, and it is an object of the present invention to provide an image shake compensation circuit for compensating for an image shake caused in a video signal producing procedure using motion information when an encoded digital video signal is decoded.

In accordance with an embodiment of the present invention, the above and other objects can be accomplished by a provision of an image shake compensation circuit comprising motion information detection means for detecting motion information based on the occurrence of an image shake when the image shake occurs in an encoded video signal; shake compensation means for obtaining a start display position of an image of a present frame according to the motion information detected by said motion information detection means; and decoding means for decoding said encoded video signal, correcting a display position of said image the present frame in response to an output signal from said shake compensation means if said encoded video signal has previously been compensated for the image shake and compensating for the image sake if said encoded video signal has not previously been compensated for the image shake Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and advantages of the present invention will be more clearly understood from the following detailed description taken in conjunction with the accompanying drawings which are given by way of illustration only, and thus are not limitative of the present invention, in which.

DETAILED DESCRIPTION OF THE PREFERRED EMBODIMENTS

Figure 1:
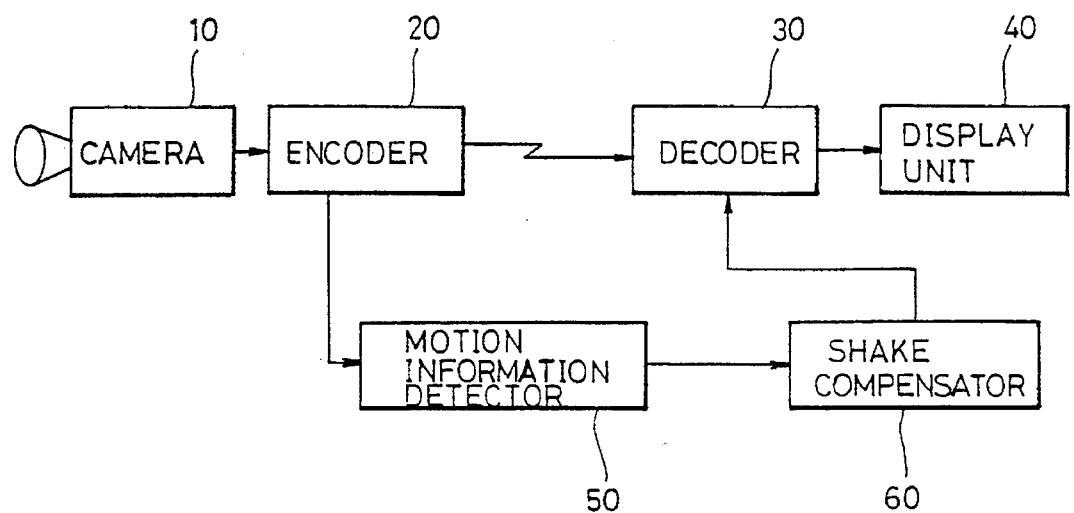
FIG. 1 is a block diagram of an example of an image shake compensation circuit in accordance with an embodiment of the present invention.

Referring to FIG. 1, there is shown a block diagram of an example of an image shake compensation circuit in accordance with an embodiment of the present invention. As shown in this drawing, the image shake compensation circuit comprises an encoder 20 for encoding a video signal inputted thereto to compress it in a digital manner. An optical image of a certain scene is produced by a camera 10 and the produced optical image is converted into an electrical signal, which is then applied as the video signal to the encoder 20.

The image shake compensation circuit also comprises a motion information detector 50 for detecting motion information based on the occurrence of an image shake when the image shake occurs in the encoder 20, a shake compensator 60 for generating a start address for correction of an image display position according to the motion information detected by the motion information detector 50, a decoder 30 for restoring a motion-compensated image and correcting a display position of the restored image in response to the compressed video signal from the encoder 20 and an output signal from the shake compensator 60, and a display unit 40 for displaying a decoded video signal from the decoder 30 as a picture.

Figure 2:
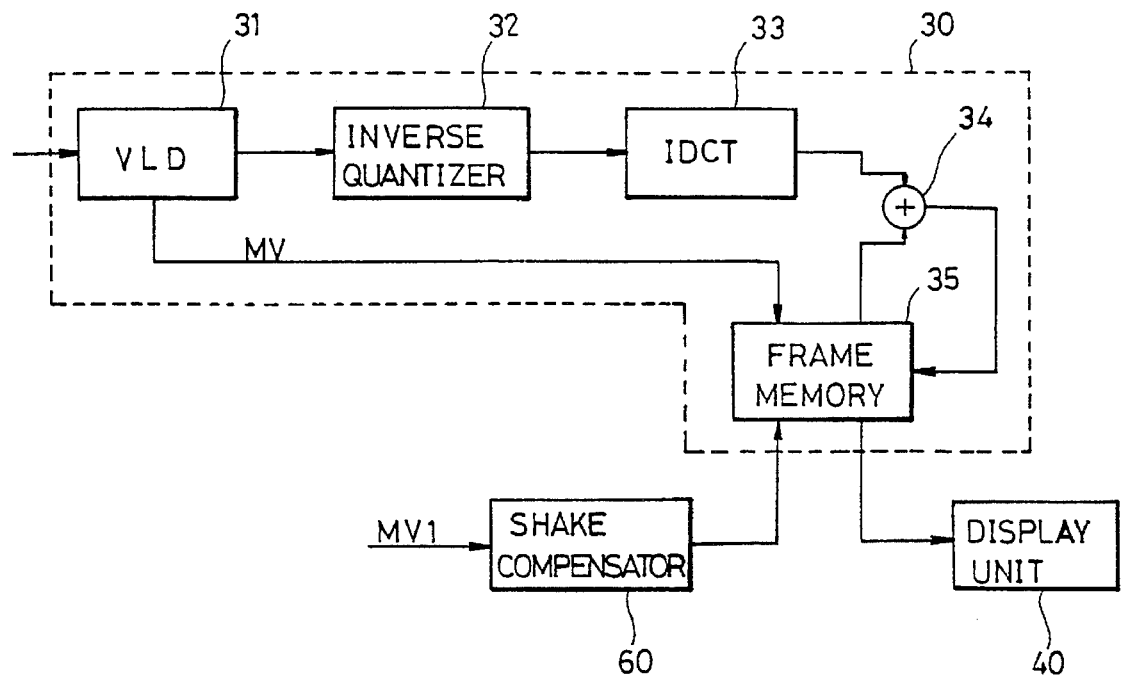
FIG. 2 is a detailed block diagram of a decoder in FIG. 1.

Referring to FIG. 2, there is shown a detailed block diagram of the decoder 30 in FIG. 1. As shown in FIG. 2, the decoder 30 includes a variable length decoder (referred to hereinafter as VLD) 31 for decoding the compressed digital video signal from the encoder 20 to expand it to the original state and separating motion information from the compressed digital video signal. In the encoder 20, the digital video signal is compressed with a length varied according to a code generation frequency.

The decoder 30 also comprises an inverse quantizer 32 for inverse-quantizing discrete cosine transform (referred to hereinafter as DCT) coefficients from the VLD 31 to restore them to the original state, and an inverse DCT (referred to hereinafter as IDCT) unit 33 for performing an IDCT operation with respect to the inverse-quantized DCT coefficients from the inverse quantizer 32 to obtain a displaced frame difference signal before removal of a spatial redundancy. The displaced frame difference signal is indicative of a difference between previous and present frames.

Further, the decoder 30 includes an adder 34 for adding the displaced frame difference signal from the IDCT unit 33 and a signal obtained by compensating a motion of a video signal of the present frame on the basis of a restored video signal of the previous frame to restore the video signal of the present frame. The decoder 30 further includes a frame memory 35 compensating for a shake of the restored video signal of the present frame from the adder 34 according to the motion information from the VLD 31 and outputting the resultant video signal to the display unit 40. The frame memory 35 is also adapted to compensate a motion of a video signal of the next frame on the basis of the restored video signal of the present frame from the adder 34 according to the motion information from the VLD 31 and output the resultant signal to the adder 34.

Figure 3:
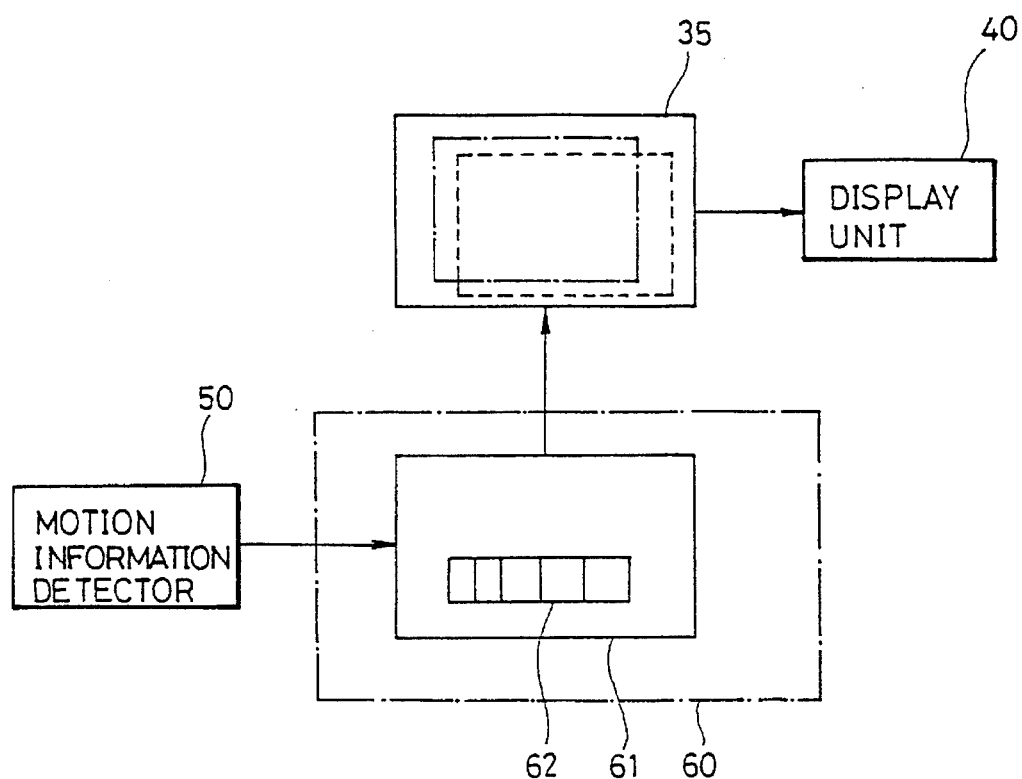
FIG. 3 is a detailed block diagram of a shake compensator in FIG. 1.

Referring to FIG. 3, there is a detailed block diagram of the shake compensator 60 in FIG. 1. As shown in FIG. 3, the shake compensator 60 includes a CRT controller 61. The CRT controller 61 includes a start position register 62 for storing the motion information from the motion information detector 50. The CRT controller 61 is adapted to determine the motion information stored in the start position register 62 as the start address and output the determined start address to the frame memory 35 in the decoder 30. The start address designates a start display position of the image on the display unit 40. Provided that the shake compensation has been performed in a transmitter, the motion information resulting from the shake compensation is detected by the motion information detector 50 and then stored into the start position register 62 in the CRT controller 61. The CRT controller 61 in the shake compensator 60 determines the motion information stored in the start position register 62 as the start address and outputs the determined start address to the frame memory 35 in the decoder 30. Then, the frame memory 35 corrects the display position of the image on the display unit 40 on the basis of the restored video signal of the present frame from the adder 34 according to the start address from the CRT controller 61.

The operation of the image shake compensation circuit with the above-mentioned construction in accordance with an embodiment of the present invention will hereinafter be described in detail.

An optical image of a certain scene is produced by the camera 10 and the produced optical image is converted into the electrical signal, which is then applied as the video signal to the encoder 20. The encoder 20 encodes the received video signal to compress it in the digital manner. Then, the compressed video signal from the encoder 20 is transmitted to the decoder 30.

Noticeably, the frame memory 35 corrects the display position of the image on the display unit 40 according to two cases. One case is that an image shake-compensated video signal from a transmitter is directly received by a receiver. The other case is that a video signal with no compensation for the image shake is transmitted from the transmitter to the receiver.

In the case where the encoder 20 receives a video signal whose image shake was previously compensated by a shake compensation circuit (not shown) contained in the camera 10, the motion information detector 50 detects a motion vector MV1 resulting from the shake compensation from the encoder 20 and outputs the detected motion vector MV1 to the shake compensator 60. On the contrary, in the case where the encoder 20 receives a video signal with no compensation for the image shake, the motion information detector 50 detects no motion vector MV1 and the encoded video signal from the encoder 20 is directly transmitted to the decoder 30.

In the decoder 30, the VLD 31 decodes the compressed digital video signal from the encoder 20 to expand it to the original state. Also, the VLD 31 separates the motion information from the compressed digital video signal. The inverse quantizer 32 inverse-quantizes the DCT coefficients from the VLD 31 to restore them to the original state. Then, the IDCT unit 33 performs the IDCT operation with respect to the inverse-quantized DCT coefficients from the inverse quantizer 32 to obtain the displaced frame difference signal before removal of the spatial redundancy. The displaced frame difference signal is then applied to the adder 34.

The adder 34 adds the displaced frame difference signal from the IDCT unit 33 and the output signal from the frame memory 35 which is obtained by compensating for the motion of the video signal of the present frame on the basis of the restored video signal of the previous frame. As a result of the addition, the adder 34 outputs the restored video signal of the present frame.

The frame memory 35 receives the restored video signal of the present frame from the adder 34 and a motion vector MV from the VLD 31. Using the motion vector MV from the VLD 31, the frame memory 35 compensates for the motion of the video signal of the next frame on the basis of the video signal of the present frame restored by the adder 34. Also, the frame memory 35 compensates for the shake of the restored video signal of the present frame from the adder 34 according to the motion vector MV from the VLD 31.

The compensation operation for the image shake will hereinafter be described in more detail.

Generally, a plurality of motion vectors are present in a video signal of one frame to indicate motion states in corresponding blocks. The motion vectors are processed in the unit of macro block (16×16 pixels) under an MPEG international standard.

Figure 4:
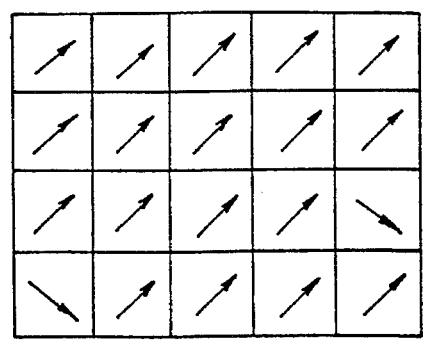
FIG. 4 is a view illustrating an example of motion vectors in a video signal of one frame.
Figure 5:
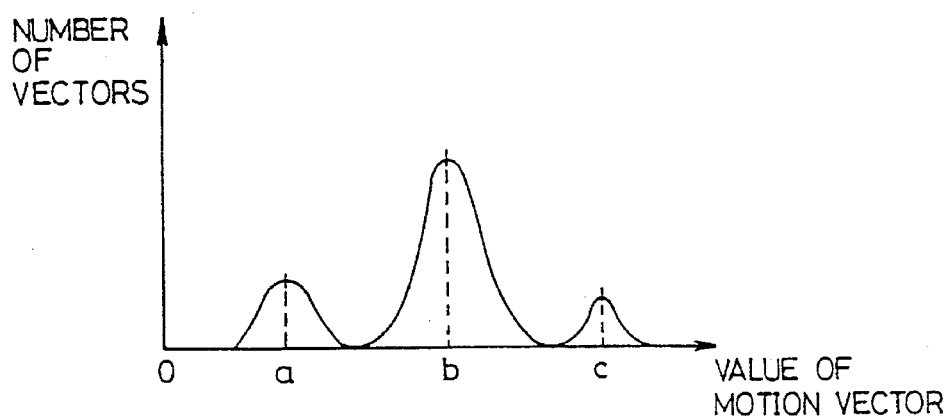
FIG. 5 is a graph illustrating a distribution of the motion vectors in FIG. 4.

In the video signal of one frame having the macro blocks as mentioned above, when all but a few motion vectors indicate the same direction as shown in FIG. 4, the occurrence of the image shake is quite within the realms of possibility in the direction indicated by the majority. This possibility can be better seen from a statistical graph of FIG. 5. In FIG. 5, the majority of motion vectors are concentrated on a certain vector value. Namely, the majority of motion vectors are concentrated on a vector value b. A few motion vectors are present on the basis of other vector values a and c. As a result, it can be assumed that the vector values a and c are connected with the motion of individual objects of the picture, whereas the vector value b is related to the motion of the entire picture, which is regarded as an external tremble such as a tremble of the user's hands. If no tremble of the user's hands is present, the majority of motion vectors may be concentrated around a vector value "0" in FIG. 5.

The motion vector value resulting from the external tremble can be searched among the plurality of motion vector values in the following manner. First, the motion vector values are partitioned into a plurality of sections, which are then sorted in the order of the larger number of motion vector values therein. Then, the largest motion vector value is obtained from one of the sorted sections having the largest number of motion vector values. The obtained motion vector value is determined as the motion vector value resulting from the external tremble.

By the way, an intentional panning of the user must not be regarded as the shake. To this end, the obtained motion vector value must be greater than a desired critical value. For this reason, the motion vector value b which is based on the external tremble must satisfy the following condition:

$$|b|<T$$

where, T is the desired critical value.

Therefore, the frame memory 35 corrects the display position of the image on the display unit 40 according to the motion vector resulting from the shake, obtained in the above manner. As a result, the frame memory 35 outputs the restored video signal of the present frame and the start display position value of the image of the present frame to the display unit 40.

Figure 6A:
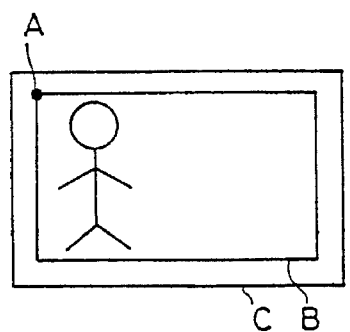
FIGS. 6A and 6B are views illustrating image states before and after shake, respectively.
Figure 6B:
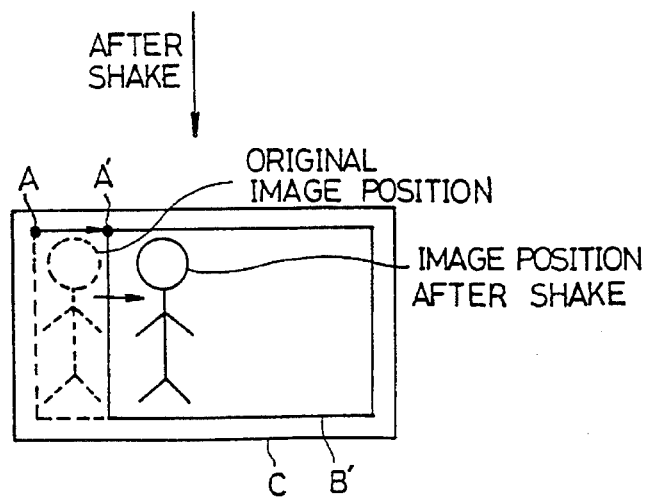

FIGS. 6A and 6B are views illustrating the principle in which the start position of the image is moved by a shake vector amount on the display unit upon the occurrence of the image shake. FIG. 6A shows an image state before the shake, in which the reference numeral C designates the frame memory, the reference numeral B designates an image information amount appearing on the display unit and the reference numeral A designates the start position of the image. FIG. 6B shows an image state after the shake. In this drawing, the image information amount appearing on the display unit is moved by the motion vector resulting from the shake, as indicated by the reference numeral B'. Also, the start position of the image is moved by the motion vector resulting from the shake, as indicated by the reference numeral A'.

On the other hand, in the case where the encoder 20 inputs the video signal whose image shake was previously compensated by the shake compensation circuit (not shown) contained in the camera 10, the frame memory 35 performs the general motion compensation function, whereas the shake compensator 60 performs the compensation function for the motion due to the shake. In this case, the motion information detector 50 detects the motion vector MV1 based on the shake compensation from the encoder 20 and outputs the detected motion vector MV1 to the shake compensator 60. In the shake compensator 60, the motion information MV1 based on the shake compensation is stored into the start position register 62 in the CRT controller 61. Then, the motion vector value resulting from the shake is obtained in the above-mentioned manner. As a result, the start display position address corresponding to the obtained motion vector value is applied to the frame memory 35 in the decoder 30.

Then, the frame memory 35 designates the start display position of the image of the present frame according to the start address from the start position register 62 in the shake compensator 60 and outputs the resultant video signal to the display unit 40.

As apparent from the above description, according to an embodiment of the present invention, the image shake compensation circuit is provided in the receiver, so that a hardware of the transmitter can be reduced in size and simplified in construction. Also, although the shake compensation is either performed or not in the transmitter, it is corrected in the reproducing procedure. This has the effect of enhancing a picture quality.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An image shake compensation circuit comprising:

motion information detection means for detecting motion information in an encoded video signal;

shake compensation means for obtaining a start display position of an image of a present frame according to the motion information detected by said motion information detection means; and decoding means for correcting a display position of the image of the present frame in response to an output signal from said shake compensation means.

2. An image shake compensation circuit as set forth in claim 1, wherein said shake compensation means is adapted to discriminate a desired value of the motion information from said motion information detection means, to regard the image shake as occurring, if the discriminated value of the motion information is greater than a predetermined value, and to obtain the start display position of said image of the present frame.

3. An image shake compensation circuit as set forth in claim 2, wherein said desired value of the motion information is obtained by arranging motion vectors of the motion information into a plurality of motion vector groups according to values of the motion vectors, and selecting a motion vector value from one of the motion vector groups having the largest number of motion vectors.

4. An image shake compensation circuit as set forth in claim 3, wherein said selected motion vector value is used as said desired value of the motion information, said selected motion vector value having the largest number of motion vectors corresponding thereto.

5. An image shake compensation circuit as set forth in claim 1, wherein said decoding means is adapted to compensate for a motion of said encoded video signal and to compensate for the image shake if said encoded video signal has not been previously compensated for the image shake.

6. An image shake compensation circuit as set forth in claim 1, wherein said shake compensation means includes a register for storing the start display position of the image of the present frame.

7. An image shake compensation circuit as set forth in claim 1, wherein said decoding means decodes the encoded video signal, said image shake compensation circuit further comprising display means for displaying the decoded video signal according to the corrected display position of the image from said decoding means.

8. An image shake compensation circuit as set forth in claim 7, wherein said shake compensation means includes a controller for controlling said display means.

9. An image shake compensation circuit as set forth in claim 1, further comprising encoding means for encoding a video signal input thereto to generate the encoded video signal, said encoding means receiving either the video signal which has been previously image-shake compensated or the video signal which has not been previously image-shake compensated.

10. An image shake compensation circuit as set forth in claim 9, further comprising image capturing means for capturing image to output the video signal to said encoding means.

11. An image shake compensation circuit as set forth in claim 9, wherein with the video signal which has not been previously image-shake compensated, said decoding means separates general motion information from the video signal and processes the video signal to compensate for image shake of the video signal.

12. An image shake compensation circuit as set forth in claim 9, wherein with the video signal which has not been previously image-shake compensated, said decoding means includes a variable length decoder for decoding the encoded video signal, an inverse quantizer for inverse-quantizing an output signal of said variable length decoder, and an inverse discrete cosine transform unit connected to said inverse quantizer for generating a displaced frame difference signal, so as to process the video signal to compensate for image shake of the video signal.

13. An image shake compensation circuit as set forth in claim 12, wherein said decoding means includes a frame memory for storing the processed video signal.

14. An image shake compensation circuit as set forth in claim 9, wherein with the video signal which has been previously image-shake compensated, said decoding means performs a general motion compensation function to the video signal.

15. An image shake compensation circuit as set forth in claim 1, wherein said decoding means includes a frame memory and a decoder for decoding the encoded video signal.

16. An image shake compensation circuit as set forth in claim 1, further comprising means for capturing image and generating the encoded video signal according to the captured image.

17. An image shake compensation circuit as set forth in claim 1, wherein said shake compensation means compares the motion information detected by said motion information detection means with a predetermined value to obtain the start display position of the image.

18. An image shake compensation circuit as set forth in claim 17, wherein the motion information includes motion vectors having motion vector values, one of the motion vector values being compared to the predetermined value.

19. An image shake compensating circuit as set forth in claim 18, wherein said one of the motion vector value has the largest number of motion vectors corresponding thereto.

* * * * *